(12) United States Patent
Berry et al.

(10) Patent No.: US 12,103,403 B2
(45) Date of Patent: Oct. 1, 2024

(54) DISCHARGING A BUS OF AN ELECTRICALLY POWERED OR HYBRID VEHICLE

(71) Applicant: JAGUAR LAND ROVER LIMITED, Coventry (GB)

(72) Inventors: Adrian Berry, Warwickshire (GB); Andrew Cotta, Warwickshire (GB); Duncan Hamilton, Warwickshire (GB)

(73) Assignee: JAGUAR LAND ROVER LIMITED, Coventry (GB)

( * ) Notice: Subject to any disclaimer, the term of this patent is extended or adjusted under 35 U.S.C. 154(b) by 809 days.

(21) Appl. No.: 17/254,538

(22) PCT Filed: May 30, 2019

(86) PCT No.: PCT/EP2019/064126
§ 371 (c)(1),
(2) Date: Dec. 21, 2020

(87) PCT Pub. No.: WO2019/243019
PCT Pub. Date: Dec. 26, 2019

(65) Prior Publication Data
US 2021/0276424 A1    Sep. 9, 2021

(30) Foreign Application Priority Data

Jun. 21, 2018   (GB) ...................................... 1810213
Jun. 21, 2018   (GB) ...................................... 1810215

(51) Int. Cl.
*B60L 3/00*         (2019.01)
*B60K 6/28*         (2007.10)
(Continued)

(52) U.S. Cl.
CPC ............... *B60L 3/0007* (2013.01); *B60L 3/04* (2013.01); *B60K 6/28* (2013.01); *B60R 16/0238* (2013.01);
(Continued)

(58) Field of Classification Search
CPC ......... B60L 3/04; B60L 3/00072; B60K 6/28; B60Y 2200/91; B60Y 2200/09
See application file for complete search history.

(56) References Cited

U.S. PATENT DOCUMENTS

2011/0049977 A1    3/2011   Onnerud et al.
2011/0304202 A1*  12/2011   TenHouten ............. B60R 16/03
                                                                  307/10.1
(Continued)

FOREIGN PATENT DOCUMENTS

CN    102481858 A    5/2012
CN    103569133 A    2/2014
(Continued)

OTHER PUBLICATIONS

State Intellectual Property Office of the People's Republic of China, Office Action and Search Report Issued in Application No. 201980041704.4, Apr. 15, 2023, 16 pages. (Submitted with Partial Translation).

(Continued)

*Primary Examiner* — Jaime Figueroa
*Assistant Examiner* — Jerrod Irvin Davis
(74) *Attorney, Agent, or Firm* — McCoy Russell LLP

(57) ABSTRACT

The present disclosure relates to a sub-system for a vehicle comprising an electrical power bus (12, 14, 16) for distributing electrical power from an electrical energy storage means (10) to various different electrical components of the vehicle, such as a combined electric traction motor/genera- (Continued)

tor (20). The sub-system comprises means for disconnecting the electrical energy storage means (10) from the bus (12, 14, 16), means (6) for measuring the potential difference between a rail of the bus of a first polarity and a chassis (18) of the vehicle, and means (4) for connecting the rail of the bus of the first polarity to the chassis (18) or a terminal of the electrical energy storage means of opposite polarity if the potential difference between the rail of the bus of the first polarity and the chassis is measured to be greater than a predetermined level, until the potential difference between the rail of the bus of the first polarity and the chassis is less than the predetermined level, then disconnecting the rail from the chassis or the terminal of the electrical energy storage means of opposite polarity, wherein the means (6) for connecting the rail of the bus to, then disconnecting the rail of the bus from, the chassis comprises the means (6) for measuring the potential difference between the rail of the bus and the chassis. This technique may be used to at least partially discharge a Y capacitance on the rail of the bus in question. The Y capacitance on any or all rails of the bus, of either polarity (positive or negative), may be discharged in this fashion, for example in the event of a collision of the vehicle, in order to render a high-voltage (HV) electrical supply sub-system (2) more safe. The present invention also provides a vehicle comprising such a sub-system and a method of reducing a potential difference between on the one hand, an electrical power bus (12, 14, 16) for distributing electrical power from an electrical energy storage means (10) of a vehicle and on the other, a chassis (18) of the vehicle to below a predetermined level.

15 Claims, 6 Drawing Sheets

(51) Int. Cl.
  *B60L 3/04* (2006.01)
  *B60R 16/023* (2006.01)
(52) U.S. Cl.
  CPC ....... *B60Y 2200/91* (2013.01); *B60Y 2200/92* (2013.01)

(56) References Cited

U.S. PATENT DOCUMENTS

| | | | |
|---|---|---|---|
| 2013/0307480 A1* | 11/2013 | Boggs | B60L 58/10 320/118 |
| 2014/0070772 A1* | 3/2014 | Andres | H01M 10/425 320/136 |
| 2014/0077826 A1* | 3/2014 | Hironaka | B60L 3/0007 324/679 |
| 2018/0134169 A1 | 5/2018 | Loftus et al. | |

FOREIGN PATENT DOCUMENTS

| | | |
|---|---|---|
| CN | 104972915 A * | 10/2015 |
| CN | 106183822 A | 12/2016 |
| CN | 108068626 A | 5/2018 |
| DE | 11 2014 002815 | 3/2016 |
| EP | 2 431 211 | 3/2012 |
| WO | 2011028703 | 8/2010 |
| WO | 2010131340 A1 | 11/2010 |
| WO | 2014199587 A1 | 12/2014 |

OTHER PUBLICATIONS

International Search Report and Written Opinion, PCT/EP2019/064126, Aug. 7, 2019, 13 pp.
Combined Search and Examination Report, GB1810213.7, Dec. 18, 2018, 6 pp.

* cited by examiner

DISCHARGING A BUS OF AN ELECTRICALLY POWERED OR HYBRID VEHICLE

CROSS-REFERENCE TO RELATED APPLICATIONS

This application is a 371 of International Application No. PCT/EP2019/064126, filed May 30, 2019, which claims priority to GB Patent Application 1810213.7 filed Jun. 21, 2018 and GB Patent Application 1810215.2 filed Jun. 21, 2018, the contents of all of which are incorporated by reference herein in their entirety.

TECHNICAL FIELD

The present disclosure relates to a sub-system for a vehicle comprising an electrical power bus for distributing electrical power from an electrical energy storage means, a vehicle comprising such a sub-system, a method of reducing a potential difference between on the one hand, an electrical power bus for distributing electrical power from an electrical energy storage means of a vehicle and on the other, a chassis of the vehicle to below a predetermined level, and a non-transitory computer-readable medium bearing a computer program product or program code for executing such a method.

BACKGROUND

Electrically powered and hybrid vehicles often use high voltages in their vehicle drive systems. Such systems are usually referred to as "HV" systems, where "HV" denotes a high voltage. For example, an electrically powered or hybrid vehicle may typically comprise an electrical energy storage means, such as a 400-volt battery or a supercapacitor, for supplying electrical power to one or more combined electric traction motor/generators of the vehicle via an electrical power bus. Legislation requires that following a collision of such a vehicle, all voltages on the electrical power bus should be reduced to below a predetermined level, such as 60 volts, within a predetermined time, such as 5 seconds. It is already common, therefore, for all voltage sources, including the electrical battery, which are connected to the bus at the time of a collision to be rapidly disconnected from the bus following the collision.

However, any capacitances attached to the bus before the voltage sources are disconnected will remain present on the bus after the voltage sources have been disconnected at the same voltages as they had before. Such capacitances are generally of two types, called "X" capacitance and "Y" capacitance. X capacitance can exist between different parts of the bus which can be at different voltages from each other, so that a potential difference exists between them, for example between a positive rail of the bus and a negative rail of the bus. Y capacitance can exist between a part of the bus and a chassis of the vehicle, so that a potential difference can arise for example between the positive rail of the bus and the chassis of the vehicle or between the negative rail of the bus and the chassis of the vehicle.

A voltage across an X capacitance may be discharged within the predetermined time required by legislation by connecting a resistance between the different parts of the bus which are at different voltages from each other, for example by connecting a resistance between the positive rail of the bus and the negative rail of the bus. The following prior art documents discuss various different techniques for discharging X capacitance: US 2014/0266044, US 2014/0070772, EP 2 664 479 A, CN 105799516 A and CN 105437981 A.

A voltage across a Y capacitance, on the other hand, is difficult to discharge within the predetermined time required by legislation. During normal operation of an electrically powered or hybrid vehicle pre-collision, the bus must be maintained at a good level of electrical isolation from the chassis of the vehicle. Some such vehicles therefore also include an isolation monitoring system (IMS) for ensuring that a good level of electrical isolation of the bus from the chassis is maintained, by periodically measuring an isolation resistance between the bus and the chassis. The isolation resistance may therefore be too high to allow a voltage on the Y capacitance to be discharged through it within the predetermined time required by legislation. On the other hand, if the isolation resistance were to be reduced, in order to reduce the Y capacitance discharge time and bring it within the predetermined time required by legislation, the minimum isolation impedance also required by legislation would not be met instead. This problem of discharging voltages on Y capacitances within the predetermined time required by legislation is made even harder if there are more devices connected to the HV bus, such as if there are two traction inverters instead of one, or if the vehicle comprises more than one HV bus. Furthermore, discharging voltages on X capacitances by connecting a resistance between parts of a bus which are at different voltages from each other can lead to an increase in voltage on the Y capacitance.

The present invention has been conceived to address this problem of discharging Y capacitances of an electrically powered or hybrid vehicle after a collision.

SUMMARY OF THE INVENTION

Aspects and embodiments of the invention provide a sub-system for a vehicle, the sub-system comprising an electrical power bus for distributing electrical power from an electrical energy storage means, an electrically powered or hybrid vehicle comprising such a sub-system, a method of reducing a potential difference between on the one hand, an electrical power bus for distributing electrical power from an electrical energy storage means of a vehicle and on the other, a chassis of the vehicle to below a predetermined level, and a non-transitory computer-readable medium bearing a computer program product or program code for executing such a method.

According to an aspect of the invention, there is provided a sub-system for a vehicle, wherein the sub-system comprises an electrical power bus for distributing electrical power from an electrical energy storage means, means for disconnecting the electrical energy storage means from the bus, means for measuring the potential difference between a rail of the bus and a chassis of the vehicle, and means for connecting the rail of the bus to the chassis if the potential difference between the rail of the bus and the chassis is measured to be greater than a predetermined level, until the potential difference between the rail and the chassis is less than the predetermined level, and then disconnecting the rail from the chassis. The means for connecting the rail of the bus to, then disconnecting the rail of the bus from, the chassis comprises the means for measuring the potential difference between the rail of the bus and the chassis.

In other words, the invention consists in using the means for measuring the potential difference between the rail of the bus and the chassis to at least partially discharge the Y capacitance on the rail of the bus as well. The Y capacitance on any or all rails of the bus may be discharged in this fashion.

The electrical energy storage means may comprise, for example, a rechargeable battery and/or a supercapacitor.

In some embodiments, the means for measuring the potential difference between the rail of the bus and the chassis may comprise a first resistance and a first switch, wherein the first resistance is connectable between the rail of the bus and the chassis by closing the first switch, and wherein the first resistance and the first switch are part of an isolation monitoring system (IMS) for confirming electrical isolation of the bus from the chassis.

If so, the means for connecting the rail of the bus to the chassis until the potential difference between the rail and the chassis is less than the predetermined level and then disconnecting the rail of the bus from the chassis may comprise the first resistance and the first switch.

In some embodiments, the vehicle sub-system may comprise means for detecting a collision of the vehicle, and wherein the means for disconnecting the electrical energy storage means from the bus, the means for measuring the potential difference between the rail of the bus and the chassis of the vehicle, and the means for connecting the rail of the bus to the chassis until the potential difference between the rail and the chassis is less than the predetermined level and then disconnecting the rail of the bus from the chassis are all controllable by the means for detecting a collision of the vehicle after the means for detecting a collision of the vehicle detects a collision of the vehicle.

If so, the means for detecting a collision of the vehicle may comprise one or more of an impact sensor, a pressure sensor, a yaw-rate sensor and/or an acceleration sensor, and a restraints control module responsive to an output of the one or more sensors to control operation of the means for disconnecting the electrical energy storage means from the bus, the means for measuring the potential difference between the rail of the bus and the chassis of the vehicle, and the means for connecting the rail of the bus to the chassis until the potential difference between the rail and the chassis is less than the predetermined level and then disconnecting the rail of the bus from the chassis.

In some embodiments, the means for disconnecting the electrical energy storage means from the bus, the means for measuring the potential difference between the rail of the bus and the chassis of the vehicle, and the means for connecting the rail of the bus to the chassis until the potential difference between the rail and the chassis is less than the predetermined level and then disconnecting the rail of the bus from the chassis may all be operable after receiving an electrical signal requesting electrical power-down of the vehicle.

At least one of the first resistances may have a resistance of at least 1 mega-ohm, but is substantially less than that of an isolating resistance isolating the rail of the bus from the chassis.

In some embodiments, the vehicle sub-system may comprise means for connecting a rail of the bus of the first polarity to a rail of the bus of the opposite polarity until the potential difference between the rail of the bus of the first polarity and the rail of the bus of the opposite polarity is substantially equal to zero, and then disconnecting the rail of the bus of the first polarity from the rail of the bus of the opposite polarity. The vehicle sub-system may therefore be used in such cases to discharge the X capacitance between the rail of the bus of the first polarity and the rail of the bus of the opposite polarity. The X capacitance between any pair of rails of the bus of opposite polarities from each other may be discharged in this fashion.

If so, the means for connecting the rail of the bus of the first polarity to and disconnecting the rail of the bus of the first polarity from the rail of the bus of the opposite polarity may comprise a second resistance and a second switch, wherein the second resistance is connectable between the rail of the bus of the first polarity and the rail of the bus of the opposite polarity by closing the second switch and wherein the second resistance and the second switch are part of the high voltage (HV) monitoring system for measuring the potential difference between the rail of the bus of the first polarity and the rail of the bus of the opposite polarity.

In another aspect, the invention provides a vehicle comprising a sub-system for a vehicle as described above. In some embodiments, the vehicle may be an electrically powered or hybrid vehicle and may also comprise an electrical energy storage means and a combined electric traction motor/generator connectable to the electrical power bus to be supplied with electrical power from the electrical energy storage means.

In a further aspect, the invention also provides a method of reducing a potential difference between a chassis of a vehicle and an electrical power bus for distributing electrical power from an electrical energy storage means of the vehicle to below a predetermined level, the method comprising disconnecting the electrical energy storage means from the bus, measuring the potential difference between a rail of the bus and the chassis to determine if it is greater than the predetermined level, and if so, connecting the rail of the bus to the chassis until the potential difference between the rail and the chassis is less than the predetermined level, then disconnecting the rail of the bus from the chassis, wherein connecting the rail of the bus to, then disconnecting the rail of the bus from, the chassis comprises using the same means as for measuring the potential difference between the rail of the bus and the chassis.

In some embodiments, measuring the potential difference between the rail of the bus and the chassis may comprise switching a first resistance connectable between the rail of the bus and the chassis into connection between the rail of the bus and the chassis, and measuring the potential difference across the first resistance when connected between the rail and the chassis, wherein the first resistance is part of an isolation monitoring system (IMS) for confirming electrical isolation of the bus from the chassis.

If so, connecting the rail of the bus to the chassis comprises switching the first resistance into connection between the rail and the chassis, and disconnecting the rail of the bus from the chassis comprises switching the first resistance out of connection between the rail and the chassis.

In embodiments, disconnecting the electrical energy storage means from the bus, measuring the potential difference between the rail of the bus and the chassis, connecting the rail of the bus to the chassis, and disconnecting the rail of the bus from the chassis may all be carried out after detecting a collision of the vehicle.

If so, disconnecting the electrical energy storage means from the bus, measuring the potential difference between the rail of the bus and the chassis, and connecting the rail of the bus to the chassis may all be carried out within 200 milliseconds from detecting the collision of the vehicle.

Alternatively, in some embodiments, disconnecting the electrical energy storage means from the bus, measuring the potential difference between the rail of the bus and the chassis, connecting the rail of the bus to the chassis, and disconnecting the rail of the bus from the chassis may all be carried out after receiving an electrical signal requesting electrical power-down of the vehicle.

If so, disconnecting the electrical energy storage means from the bus, measuring the potential difference between the rail of the bus and the chassis, and connecting the rail of the bus to the chassis may all be carried out within 1 second from receiving the electrical signal requesting electrical power-down of the vehicle.

In either case, in some embodiments, disconnecting the electrical energy storage means from the bus, measuring the potential difference between the rail of the bus and the chassis, connecting the rail of the bus to the chassis, and disconnecting the rail of the bus from the chassis may all be carried out within 5 seconds.

The method may also comprise connecting a rail of the bus of a first polarity to a rail of the bus of the opposite polarity via a second resistance after disconnecting the rail of the bus of the first polarity from the chassis.

If so, in some embodiments, disconnecting the electrical energy storage means from the bus, measuring the potential difference between the rail of the bus and the chassis, connecting the rail of the bus to the chassis, disconnecting the rail of the bus from the chassis, and connecting the rail of the bus of the first polarity to the rail of the bus of the opposite polarity may all be carried out within 5 seconds.

The predetermined level may be substantially equal to 60 volts.

In a further aspect, the invention also provides a non-transitory computer readable medium bearing a computer program product or program code for executing a method of reducing a potential difference between on the one hand, an electrical power bus for distributing electrical power from an electrical energy storage means of a vehicle and on the other, a chassis of the vehicle to below a predetermined level, as described herein.

According to an aspect of the invention, there is provided a sub-system for a vehicle, wherein the sub-system comprises an electrical power bus for distributing electrical power from an electrical energy storage means, means for disconnecting the electrical energy storage means from the bus, means for measuring the potential difference between a rail of the bus of a first polarity and a chassis of the vehicle, and means for connecting the rail of the bus of the first polarity to a terminal of the electrical energy storage means of opposite polarity if the potential difference between the rail of the bus of the first polarity and the chassis is measured to be greater than a predetermined level, until the potential difference between the rail of the first polarity and the chassis is less than the predetermined level, then disconnecting the rail of the first polarity from the terminal of the electrical energy storage means of the opposite polarity.

In other words, the invention consists in connecting the rail of the bus of the first polarity to the terminal of the electrical energy storage means of the opposite polarity to at least partially discharge the Y capacitance on the rail of the bus in question. The Y capacitance on any or all rails of the bus, of either polarity (positive or negative), may be discharged in this fashion.

The electrical energy storage means may comprise, for example, a rechargeable battery and/or a supercapacitor.

The means for connecting the rail of the bus of the first polarity to and disconnecting the rail of the bus of the first polarity from the terminal of the electrical energy storage means of the opposite polarity may comprise a third resistance and a third switch, wherein the third resistance is connectable between the rail of the bus of the first polarity and the terminal of the electrical energy storage means of the opposite polarity by closing the third switch and wherein the third resistance and the third switch are part of a high-voltage (HV) monitoring system for measuring the potential difference between the rail of the bus of the first polarity and the terminal of the electrical energy storage means of the opposite polarity. In other words, components of the HV monitoring system, which are normally used for measuring the potential difference between the rail of the bus of the first polarity and the terminal of the electrical energy storage means of the opposite polarity, can also be used to at least partially discharge the Y capacitance on the rail of the bus in question as well.

The means for measuring the potential difference between the rail of the bus of the first polarity and the chassis may comprise a second resistance and a second switch, wherein the second resistance is connectable between the rail of the bus of the first polarity and the chassis by closing the second switch, and wherein the second resistance and the second switch are part of an isolation monitoring system (IMS) for confirming electrical isolation of the bus from the chassis.

In some embodiments, the vehicle sub-system may comprise means for detecting a collision of the vehicle, and wherein the means for disconnecting the electrical energy storage means from the bus, the means for measuring the potential difference between the rail of the bus of the first polarity and the chassis of the vehicle, and the means for connecting the rail of the bus of the first polarity to and disconnecting the rail of the bus of the first polarity from the terminal of the electrical energy storage means of the opposite polarity are all controllable by the means for detecting a collision of the vehicle after the means for detecting a collision of the vehicle detects a collision of the vehicle.

If so, the means for detecting a collision of the vehicle may comprise one or more of an impact sensor, a pressure sensor, a yaw-rate sensor and/or an acceleration sensor, and a restraints control module responsive to an output of the one or more sensors to control operation of the means for disconnecting the electrical energy storage means from the bus, the means for measuring the potential difference between the rail of the bus of the first polarity and the chassis of the vehicle, and the means for connecting the rail of the bus of the first polarity to and disconnecting the rail of the bus of the first polarity from the terminal of the electrical energy storage means of the opposite polarity.

In some embodiments, the means for disconnecting the electrical energy storage means from the bus, the means for measuring the potential difference between the rail of the bus of the first polarity and the chassis of the vehicle, and the means for connecting the rail of the bus of the first polarity to and disconnecting the rail of the bus of the first polarity from the terminal of the electrical energy storage means of the opposite polarity may all be operable after receiving an electrical signal requesting electrical power-down of the vehicle.

The third resistance may have a resistance of at least 1 mega-ohm, which is substantially greater than a passive discharge resistance of a load connected to the bus.

In some embodiments, the vehicle sub-system may comprise means for connecting the rail of the bus of the first polarity to a rail of the bus of the opposite polarity until the potential difference between the rail of the bus of the first polarity and the rail of the bus of the opposite polarity is substantially equal to zero, and then disconnecting the rail of the bus of the first polarity from the rail of the bus of the opposite polarity. The vehicle sub-system may therefore be used in such cases to discharge the X capacitance between the rail of the bus of the first polarity and the rail of the bus of the opposite polarity. The X capacitance between any pair of rails of the bus of opposite polarities from each other may be discharged in this fashion.

If so, the means for connecting the rail of the bus of the first polarity to and disconnecting the rail of the bus of the first polarity from the rail of the bus of the opposite polarity may comprise a third resistance and a third switch, wherein the third resistance is connectable between the rail of the bus of the first polarity and the rail of the bus of the opposite polarity by closing the third switch and wherein the third resistance and the third switch are part of the high voltage (HV) monitoring system for measuring the potential difference between the rail of the bus of the first polarity and the rail of the bus of the opposite polarity.

In another aspect, the invention provides a vehicle comprising a sub-system for a vehicle as described above. In some embodiments, the vehicle may be an electrically powered or hybrid vehicle and may also comprise an electrical energy storage means and a combined electric traction motor/generator connectable to the electrical power bus to be supplied with electrical power from the electrical energy storage means.

In a further aspect, the invention also provides a method of reducing a potential difference between a chassis of a vehicle and an electrical power bus for distributing electrical power from an electrical energy storage means of the vehicle to below a predetermined level, the method comprising disconnecting the electrical energy storage means from the bus, measuring the potential difference between a rail of the bus of a first polarity and the chassis to determine if it is greater than the predetermined level, and if so, connecting the rail of the bus of the first polarity to a terminal of the electrical energy storage means of the opposite polarity until the potential difference between the rail of the first polarity and the chassis is less than the predetermined level, then disconnecting the rail of the bus of the first polarity from the terminal of the electrical energy storage means of the opposite polarity.

In some embodiments, connecting the rail of the bus of the first polarity to the terminal of the electrical energy storage means of the opposite polarity comprises switching a third resistance connectable between the rail of the bus of the first polarity and the terminal of the electrical energy storage means of the opposite polarity into connection between the rail of the first polarity and the terminal of the opposite polarity, disconnecting the rail of the bus of the first polarity from the terminal of the electrical energy storage means of the opposite polarity comprises switching the third resistance out of connection between the rail of the first polarity and the terminal of the opposite polarity, wherein the third resistance is part of a high voltage (HV) monitoring system for measuring the potential difference between the rail of the bus of the first polarity and the terminal of the electrical energy storage means of the opposite polarity.

In some embodiments, measuring the potential difference between the rail of the bus of the first polarity and the chassis comprises switching a second resistance connectable between the rail of the bus of the first polarity and the chassis into connection between the rail of the bus of the first polarity and the chassis, and measuring the potential difference across the second resistance when connected between the rail of the bus of the first polarity and the chassis.

In embodiments, disconnecting the electrical energy storage means from the bus, measuring the potential difference between a rail of the bus of a first polarity and the chassis to determine if it is greater than the predetermined level, and if so, connecting the rail of the bus of the first polarity to a terminal of the electrical energy storage means of the opposite polarity until the potential difference between the rail of the first polarity and the chassis is less than the predetermined level, then disconnecting the rail of the bus of the first polarity from the terminal of the electrical energy storage means of the opposite polarity may all be carried out after detecting a collision of the vehicle.

If so, disconnecting the electrical energy storage means from the bus, measuring the potential difference between the rail of the bus of the first polarity and the chassis, and connecting the rail of the bus of the first polarity to the terminal of the electrical energy storage means of the opposite polarity may all be carried out within 200 milliseconds from detecting the collision of the vehicle.

Alternatively, in some embodiments, disconnecting the electrical energy storage means from the bus, measuring the potential difference between a rail of the bus of a first polarity and the chassis to determine if it is greater than the predetermined level, and if so, connecting the rail of the bus of the first polarity to a terminal of the electrical energy storage means of the opposite polarity until the potential difference between the rail of the first polarity and the chassis is less than the predetermined level, then disconnecting the rail of the bus of the first polarity from the terminal of the electrical energy storage means of the opposite polarity may all be carried out after receiving an electrical signal requesting electrical power-down of the vehicle.

If so, disconnecting the electrical energy storage means from the bus, measuring the potential difference between the rail of the bus of the first polarity and the chassis, and connecting the rail of the bus of the first polarity to the terminal of the electrical energy storage means of the opposite polarity may all be carried out within 1 second from receiving the electrical signal requesting electrical power-down of the vehicle.

In either case, in some embodiments, disconnecting the electrical energy storage means from the bus, measuring the potential difference between the rail of the bus of the first polarity and the chassis, connecting the rail of the bus of the first polarity to the terminal of the electrical energy storage means of the opposite polarity, and disconnecting the rail of the bus of the first polarity from the terminal of the electrical energy storage means of the opposite polarity may all be carried out within 5 seconds.

The method may also comprise connecting the rail of the bus of the first polarity to a rail of the bus of the opposite polarity via a third resistance after disconnecting the rail of the bus of the first polarity from the terminal of the electrical energy storage means of the opposite polarity.

If so, in some embodiments, disconnecting the electrical energy storage means from the bus, measuring the potential difference between the rail of the bus of the first polarity and the chassis, connecting the rail of the bus of the first polarity to the terminal of the electrical energy storage means of the opposite polarity, disconnecting the rail of the bus of the first polarity from the terminal of the electrical energy storage means of the opposite polarity and connecting the rail of the bus of the first polarity to the rail of the bus of the opposite polarity may all be carried out within 5 seconds.

The predetermined level may be substantially equal to 60 volts.

In a further aspect, the invention also provides a non-transitory computer readable medium bearing a computer program product or program code for executing a method of reducing a potential difference between on the one hand, an electrical power bus for distributing electrical power from an electrical energy storage means of a vehicle and on the other, a chassis of the vehicle to below a predetermined level, as described herein.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

Figure 1:
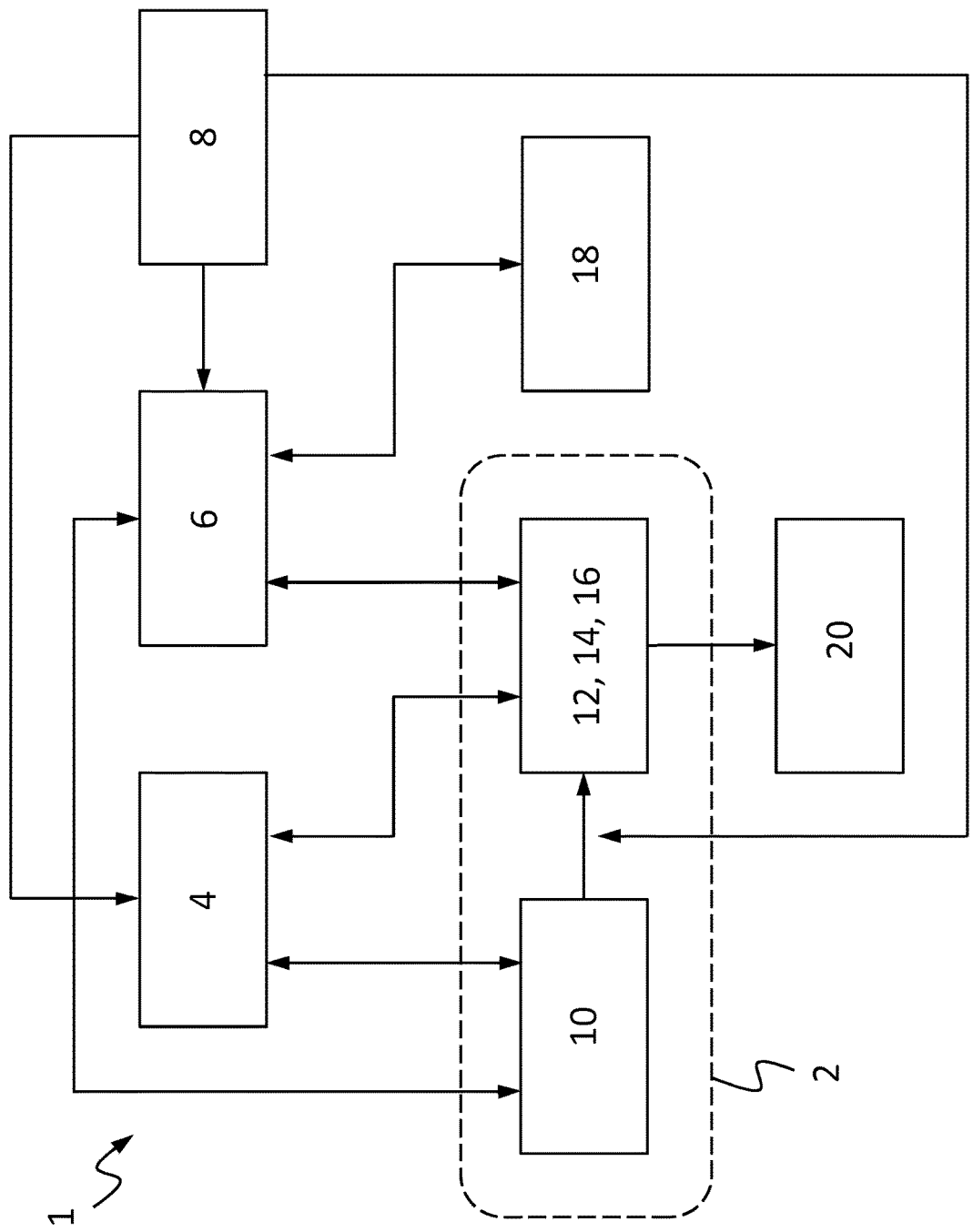
FIG. 1 is a schematic block diagram of an embodiment of a vehicle sub-system comprising a high voltage (HV) electrical supply sub-system.

FIG. 1 schematically shows a vehicle sub-system 1 comprising a high voltage (HV) electrical supply sub-system 2, a high voltage (HV) monitoring system 4, an isolation monitoring system (IMS) 6 and a restraints control module 8. The HV electrical supply sub-system 2 comprises an electrical energy storage means 10 and an electrical power bus 12, 14, 16. The electrical energy storage means 10 comprises, for example, a battery and/or a supercapacitor. The electrical power bus 12, 14, 16 is for distributing electrical power from the electrical energy storage means 10 to various different electrical components of the vehicle, such as to one or more combined electric traction motor/generators 20. The HV monitoring system 4 is for monitoring voltages on various different parts of the HV electrical supply sub-system 2, such as between terminals of the electrical energy storage means 10 or on different rails of the bus 12, 14, 16. The isolation monitoring system (IMS) 6 is for monitoring electrical isolation of the HV electrical supply sub-system 2 from a chassis 18 of the vehicle. The restraints control module 8 is for detecting a collision of the vehicle, and receives electrical signals from, for example, impact sensors, pressure sensors, yaw-rate sensors and/or accelerometers to detect a collision of the vehicle. In response to the detection of such a collision, the restraints control module 8 can control operation of such components of the vehicle as airbags, seat belt tensioners, hazard warning lights, and so on. According to an embodiment of the invention, the restraints control module 8 can also control connection of the electrical energy storage means 10 to the bus 12, 14, 16, as well as operation of the HV monitoring system 4 and of the IMS 6, in a manner to be described in greater detail below.

Figure 2:
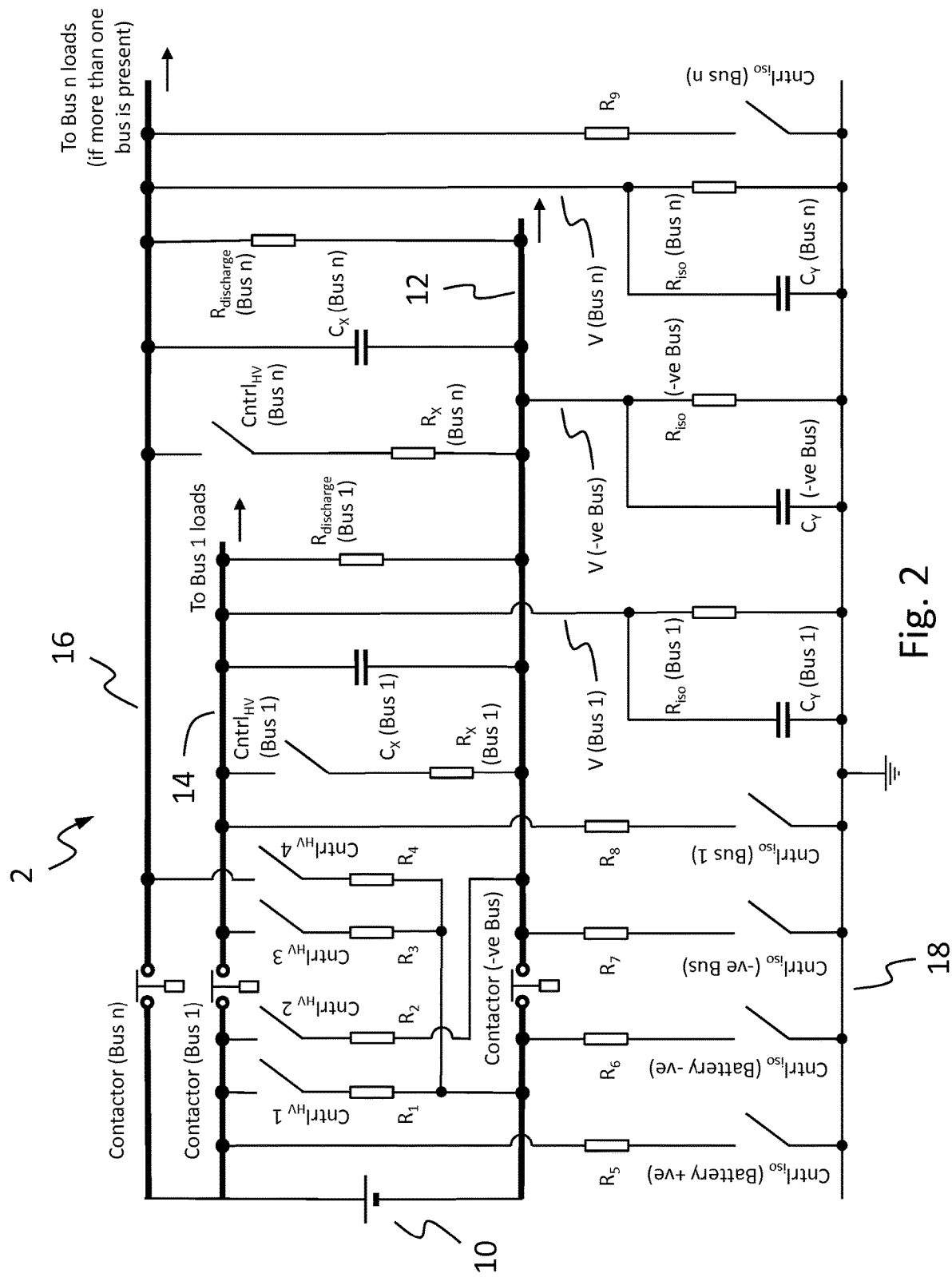
FIG. 2 is a circuit diagram of an embodiment of a high voltage (HV) electrical supply sub-system such as that shown in FIG. 1.

FIG. 2 is a circuit diagram schematically showing the HV electrical supply sub-system 2 of FIG. 1 in greater detail. As FIG. 2 shows, the HV electrical supply sub-system 2 comprises an electrical energy storage means, which in this embodiment is a battery 10, but which in other embodiments may alternatively or additionally comprise, for example, a supercapacitor. The HV electrical supply sub-system 2 also comprises an electrical power bus 12, 14, 16 for distributing electrical power from the battery 10 to various different electrical components of the vehicle. The electrical power bus comprises a negative bus or rail 12 and at least one positive bus or rail 14. To accommodate a greater number of loads representing a greater number of electrical components of the vehicle which can be supplied with electrical power by the battery 10, the electrical power bus may comprise one or more auxiliary buses or rails 16. Hereinafter, the first positive bus or rail 14 will be referred to as "Bus 1" and the one or more auxiliary positive buses or rails 16 will be referred to as "Bus n". Each of the negative and positive buses or rails 12, 14, 16 may be connected to a respectively positive or negative terminal of the battery 10 via a respective electrical contactor, labelled "Contactor (−ve bus)", "Contactor (Bus 1)" and "Contactor (Bus n)" in FIG. 2. During operation of the HV electrical supply sub-system 2, the contactors are opened and closed as required to supply electrical power to the one or more loads connected across one of the positive buses 14, 16 on the one hand and the negative bus 12 on the other. The passive discharge resistances of these loads are respectively represented in FIG. 2 by the resistors labelled "Rdischarge (Bus 1)" and "Rdischarge (Bus n)". These discharge resistances each represent the parallel combination of the passive discharge resistances of each load connected to the buses. The values of Rdischarge (Bus 1) and Rdischarge (Bus n) each typically amount to a few tens of kilo-ohms, for example.

In FIG. 2, the X capacitance between Bus 1 and the negative bus 12 is labelled "Cx (Bus 1)" and the X capacitance between Bus n and the negative bus 12 is similarly labelled "Cx (Bus n)". As also shown in FIG. 2, adjacent to the HV electrical supply sub-system 2 is a chassis 18 of the vehicle, which is at or near to ground potential. Each of the negative and positive buses 12, 14, 16 is isolated from the chassis 18 by a large isolating resistance, which are respectively labelled "$R_{iso}$ (−ve bus)", "$R_{iso}$ (Bus 1)" and "$R_{iso}$ (Bus n)" in FIG. 2. The values of these large isolating resistances will depend on the particular construction of the vehicle, but may include the resistances of such insulating components as rubber mounts and plastic sheathing for electrical cables, and so on. In parallel to each of these isolating resistances are the Y capacitances of the electrical power bus 12, 14, 16. In FIG. 2, the Y capacitance between the negative bus 12 and the chassis 18 is labelled "CY (−ve Bus)", the Y capacitance between Bus 1 and the chassis 18 is labelled "CY (Bus 1)" and the Y capacitance between Bus n and the chassis 18 is labelled "CY (Bus n)".

The HV electrical supply sub-system 2 is monitored by isolation monitoring system (IMS) 6. The IMS 6 monitors and manages the isolation of the battery 10 and of the electrical power bus 12, 14, 16 from the chassis 18. The isolation monitoring system comprises a plurality of high-value resistors, labelled $R_5$, $R_6$, $R_7$, $R_8$ and $R_9$ in FIG. 2, as well as a plurality of corresponding controllable switches, labelled "$Cntrl_{iso}$ (Battery +ve)", "$Cntrl_{iso}$ (Battery −ve)", "$Cntrl_{iso}$ (−ve Bus)", "$Cntrl_{iso}$ (Bus 1)" and "$Cntrl_{iso}$ (Bus n)" in FIG. 2. During operation of the IMS 6, $R_5$ can be connected between the positive terminal of the battery 10 and the chassis 18 by closing the switch $Cntrl_{iso}$ (Battery +ve), $R_6$ can be connected between the negative terminal of the battery 10 and the chassis 18 by closing the switch $Cntrl_{iso}$ (Battery −ve), $R_7$ can be connected between the negative bus 12 and the chassis 18 by closing the switch $Cntrl_{iso}$ (−ve Bus), R& can be connected between Bus 1 and the chassis 18 by closing the switch $Cntrl_{iso}$ (Bus 1) and $R_9$ can be connected between Bus n and the chassis 18 by closing the switch $Cntrl_{iso}$ (Bus n). The values of $R_5$, $R_6$, $R_7$, $R_8$ and $R_9$ are high, for example 2 mega-ohms each, to ensure that if the corresponding one of the controllable switches of the IMS is momentarily closed, very little current flows through the respective resistor to the chassis 18. On the other hand, the values of $R_5$, $R_6$, $R_7$, $R_8$ and $R_9$ are generally less than the very high values of the large isolating resistances $R_{iso}$ (−ve bus), $R_{iso}$ (Bus 1) and $R_{iso}$ (Bus n).

During operation of the isolation monitoring system 6, at predetermined intervals, the IMS 6 momentarily closes a respective one of these controllable switches and measures the potential difference across the corresponding one of the high-value resistors $R_5$, $R_6$, $R_7$, $R_8$ and $R_9$ to ensure continuing electrical isolation of a corresponding part of the HV electrical supply sub-system 2 from the chassis 18. A potential difference across the corresponding one of the high-value resistors $R_5$, $R_6$, $R_7$, $R_8$ and $R_9$ above a predetermined level will indicate the continuing isolation of the corresponding part of the HV electrical supply sub-system 2 from the chassis 18. On the other hand, a potential difference across the corresponding one of the high-value resistors $R_5$, $R_6$, $R_7$, $R_8$ and $R_9$ below the predetermined level could indicate a potential failure of some component of a corresponding one of the large isolating resistances $R_{iso}$ (−ve bus), $R_{iso}$ (Bus 1) and $R_{iso}$ (Bus n) or of the battery 10.

According to an embodiment of the invention, in order to reduce the potential difference between the electrical power bus 12, 14, 16 and the chassis 18 below a predetermined level, and therefore in order to discharge one or more of the Y capacitances CY (−ve Bus), CY (Bus 1) and CY (Bus n) on the buses 12, 14, 16, a corresponding one or more of the controllable switches of the IMS 6 can be closed until the potential difference is measured by the IMS 6 to be below the predetermined level. Thereafter, the controllable switches of the IMS can be opened again, in order to restore the electrical isolation of the electrical power bus 12, 14, 16 from the chassis 18 by the large isolating resistances $R_{iso}$ (−ve bus), $R_{iso}$ (Bus 1) and $R_{iso}$ (Bus n). This technique may be used, for example, after a collision of the vehicle to rapidly reduce the potential difference to below 60 volts. In such a case, the IMS 6 can be controlled by the restraints control module 8 as just described. Alternatively or additionally, the same technique may be used as part of a power-down operation of the HV electrical supply sub-system 2 to reduce the potential difference to zero.

Returning to FIG. 2, it may be seen that the HV electrical supply sub-system 2 is also monitored by HV monitoring system 4. The HV monitoring system 4 comprises a plurality of high-value resistors, labelled $R_1$, $R_2$, $R_3$, $R_4$, "Rx (Bus 1)" and "Rx (Bus n)" in FIG. 2, as well as a plurality of corresponding controllable switches, labelled "$Cntrl_{HV}$ 1", "$Cntrl_{HV}$ 2", "$Cntrl_{HV}$ 3", "$Cntrl_{HV}$ 4", "$Cntrl_{HV}$ (Bus 1)" and "$Cntrl_{HV}$ (Bus n)" in FIG. 2. During operation of the high-voltage monitoring system, $R_1$ can be connected between the positive and negative terminals of the battery 10 by closing the switch $Cntrl_{HV}$ 1, $R_2$ can be connected between the negative bus 12 and the positive terminal of the battery 10 by closing the switch $Cntrl_{HV}$ 2, $R_3$ can be connected between Bus 1 and the negative terminal of the battery 10 by closing the switch $Cntrl_{HV}$ 3, $R_4$ can be connected between Bus n and the negative terminal of the battery 10 by closing the switch $Cntrl_{HV}$ 4, Rx (Bus 1) can be connected between Bus 1 and the negative bus 12 by closing the switch $Cntrl_{HV}$ (Bus 1) and Rx (Bus n) can be connected between Bus n and the negative bus 12 by closing the switch $Cntrl_{HV}$ (Bus n). The values of $R_1$, $R_2$, $R_3$, $R_4$, Rx (Bus 1) and Rx (Bus n) are high in comparison to the discharge resistances Rdischarge (Bus 1) and Rdischarge (Bus n) of the loads connected to the electrical power bus 12, 14, 16, for example 1 Mega-ohm each, to ensure that if the corresponding one of the controllable switches of the HV monitoring system is momentarily closed, very little current flows through the respective resistor.

During operation of the HV monitoring system 4, at predetermined intervals, the HV monitoring system 4 momentarily closes a respective one of these controllable switches and measures the potential difference across the corresponding one of the high-value resistors $R_1$, $R_2$, $R_3$, $R_4$, Rx (Bus 1) and Rx (Bus n) in order to measure the voltages on different parts of the HV electrical supply sub-system 2. For example, by momentarily closing the switch $Cntrl_{HV}$ 1, the HV monitoring system 4 can measure the potential difference across $R_1$, and therefore the voltage across the terminals of the battery 10, in order to determine whether or not the battery needs recharging. The HV monitoring system 4 can similarly determine the voltages on one or more of the positive and negative buses 12, 14, 16 by momentarily closing an appropriate one or ones of the other controllable switches of the HV monitoring system to measure the potential difference across the corresponding one or ones of the other resistors $R_2$, $R_3$, $R_4$, Rx (Bus 1) and Rx (Bus n). One or more of the contactors, Contactor (−ve bus), Contactor (Bus 1) and Contactor (Bus n), between the battery 10 and the electrical power bus 12, 14, 16 can then opened and/or closed, in order to adjust the voltages on the bus as desired.

However, according to an embodiment of the invention, in order to rapidly reduce the potential difference between one or more of Bus 1 and Bus n on the one hand and the negative bus 12 on the other below a predetermined level, and therefore in order to discharge one or more of the X capacitances Cx (Bus 1) and Cx (Bus n), a corresponding one or more of the controllable switches $Cntrl_{HV}$ (Bus 1) and $Cntrl_{HV}$ (Bus n) can be closed by the HV monitoring system, allowing current to flow through the respective one or ones of Rx (Bus 1) and Rx (Bus n) until the potential difference between the positive and negative buses is measured by the HV monitoring system 4 to be below this predetermined level. This technique may be used, for example, after a collision of the vehicle, under control of the restraints control module 8, and/or as part of a power-down operation of the HV electrical supply sub-system 2, to rapidly reduce the potential difference between the positive and negative buses, including, possibly, to zero.

Moreover, according to another embodiment of the invention, as an alternative to or in addition to the technique described above for discharging Y capacitances, in order to help reduce the potential difference between the electrical power bus 12, 14, 16 and the chassis 18 below a predetermined level, and therefore in order to help discharge one or more of the Y capacitances CY (−ve Bus), CY (Bus 1) and CY (Bus n) on the buses 12, 14, 16, one or more of the controllable switches of the HV monitoring system 4 can be closed to connect a bus of one polarity to a terminal of the battery 10 of the opposite polarity until the potential difference between the bus in question and the chassis 18 is measured to be below the predetermined level. For example, by closing the switch $Cntrl_{HV}$ 3, Bus 1 can be connected to the negative terminal of the battery 10 through the resistor $R_3$, thereby helping to pull the voltage of Bus 1 down towards the ground voltage of the chassis 18. Similarly, by closing the switch $Cntrl_{HV}$ 4, Bus n can be connected to the negative terminal of the battery 10 through the resistor $R_4$, thereby helping to pull the voltage of Bus n down towards the ground voltage of the chassis 18. Alternatively, by closing the switch $Cntrl_{HV}$ 2, the negative bus 12 can be connected to the positive terminal of the battery 10 through the resistor $R_2$, thereby helping to pull the voltage of the negative bus 12 up towards the ground voltage of the chassis 18. Thereafter, whichever one or ones of the controllable switches of the HV monitoring system 4 have been closed in this manner can be opened again, in order to ensure that the electrical power bus 12, 14, 16 is disconnected from the battery 10 once again and to prevent an "overshoot" of the voltage on the bus in the opposite direction. This technique may be used, for example, after a collision of the vehicle to rapidly reduce the potential difference between the electrical power bus 12, 14, 16 and the chassis 18 below 60 volts. In such a case, the HV monitoring system 4 can be controlled by the restraints control module 8 as just described. Alternatively or additionally, the same technique may be used as part of a power-down operation of the HV electrical supply sub-system 2 to reduce the potential difference to zero.

Figure 3:
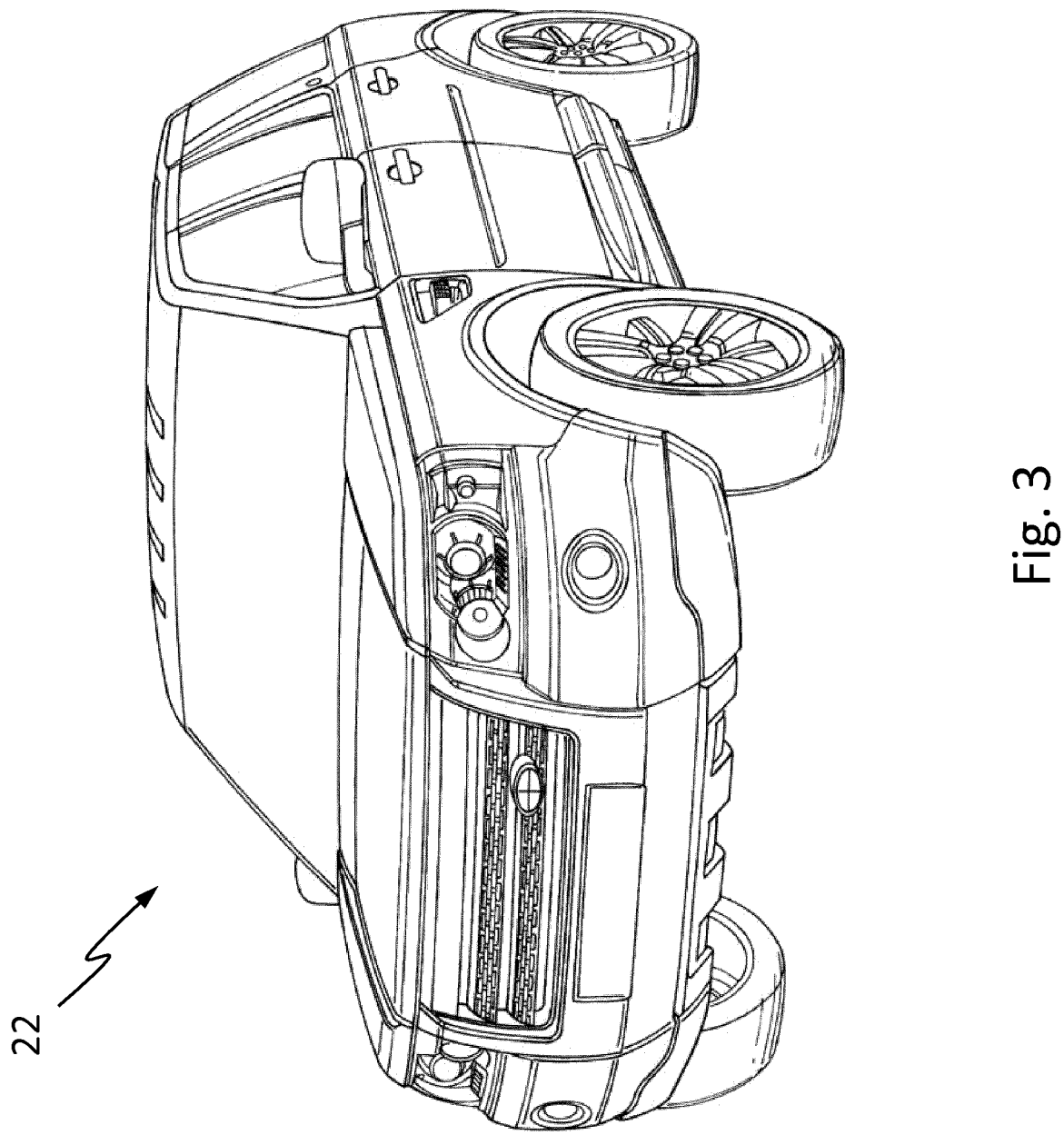
FIG. 3 is a schematic perspective view of an embodiment of a hybrid vehicle comprising a vehicle sub-system such as that shown in FIG. 1.

FIG. 3 shows an example of a hybrid vehicle 22 comprising a vehicle sub-system such as the vehicle sub-system 1 shown in FIG. 1, as well as a combined electric traction motor/generator connectable to the electrical power bus 12, 14, 16 to be supplied with electrical power from the electrical battery 10.

Figure 4:
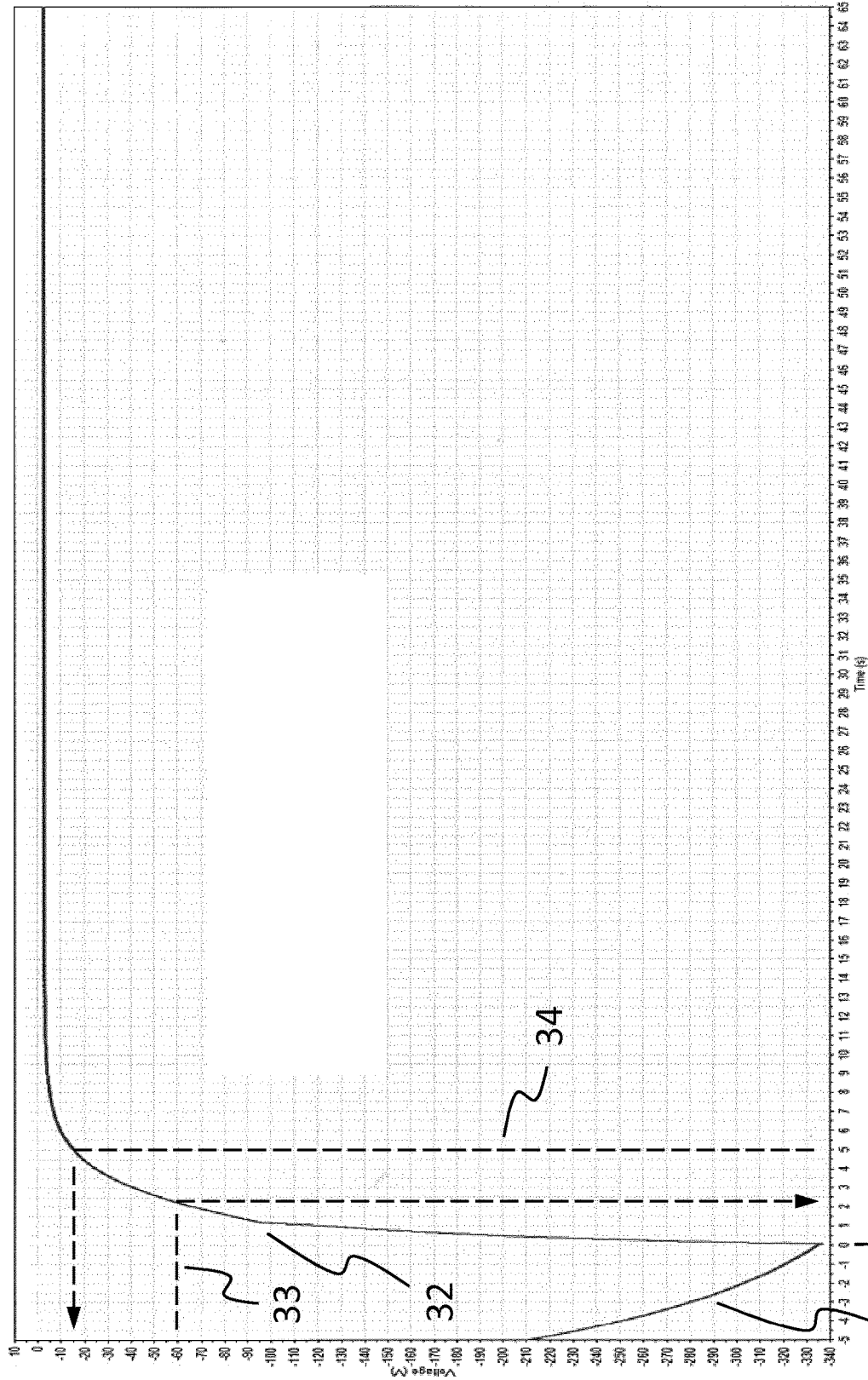
FIG. 4 is a graph showing a first read-out from a test discharge of an electrical power bus of an HV electrical supply sub-system such as that shown in FIG. 2.

FIG. 4 is a graph showing a first read-out from a test discharge carried out on the HV electrical supply sub-system 2 shown in FIG. 2, in which the potential difference between the negative rail 12 of the electrical power bus and the chassis 18 as measured in volts on the y-axis or ordinate is plotted against time as measured in seconds on the x-axis or abscissa. In FIG. 4, reading the graph from left to right, a first portion 30 of the graph represents the normal behaviour of the negative rail 12 before the discharge commences. As may be seen, during this time, the voltage on the negative rail 12 becomes increasingly negative, dropping from about −210 volts to about −340 volts. At time =0 seconds, as indicated in FIG. 4 by reference numeral 31, the bus is disconnected from the battery 10, for example by opening the contactor Contactor (−ve bus), and discharge of the X capacitance is initiated, in this example by closing the switch $Cntrl_{HV}$ (Bus 1), thereby connecting the positive and negative rails 12, 14 to each other. If such an HV electrical supply sub-system comprises an auxiliary bus, as the HV electrical supply sub-system 2 shown in FIG. 2 does, then the switch $Cntrl_{HV}$ (Bus n) connecting the auxiliary bus 16 to the negative rail 12 may be closed as well in order to discharge the X capacitance between the auxiliary bus 16 and the negative rail 12. The potential difference between the negative rail 12 and the chassis 18 therefore reduces rapidly, its value becoming more positive, until the point of inflection indicated on FIG. 4 by reference numeral 32, when the positive and negative rails 12, 14 are at substantially the same voltage as each other, relative to the chassis 18, at which point, discharge of the Y capacitance between the negative rail 12 and the chassis 18 is triggered. In this case, discharge of the Y capacitance is triggered when the positive and negative rails 12, 14 have both reached about −90 volts, relative to the chassis 18. Discharge of the Y capacitance on the negative rail 12 is initiated, for example, by closing the switch $Cntrl_{iso}$ (−ve Bus) connecting the negative rail 12 to the chassis 18. As the dashed read-off line labelled 33 on FIG. 4 shows, the potential difference between the negative rail 12 and the chassis 18 then reaches the target value of −60 volts in only 2.24 seconds, well within the predetermined time limit of 5 seconds, and continues to reduce until at the predetermined time of 5 seconds after commencement of the discharge event, the value of the potential difference has risen further to only −15.24 volts, well below the predetermined level, as the dashed read-off line labelled 34 shows. The potential difference continues to drop asymptotically thereafter towards zero. Following the discharge, the closed switches through which the sub-system 2 has been discharged are opened once again to re-isolate the positive and negative rails 12, 14, 16 of the sub-system 2 from each other and from the chassis 18.

Figure 5:
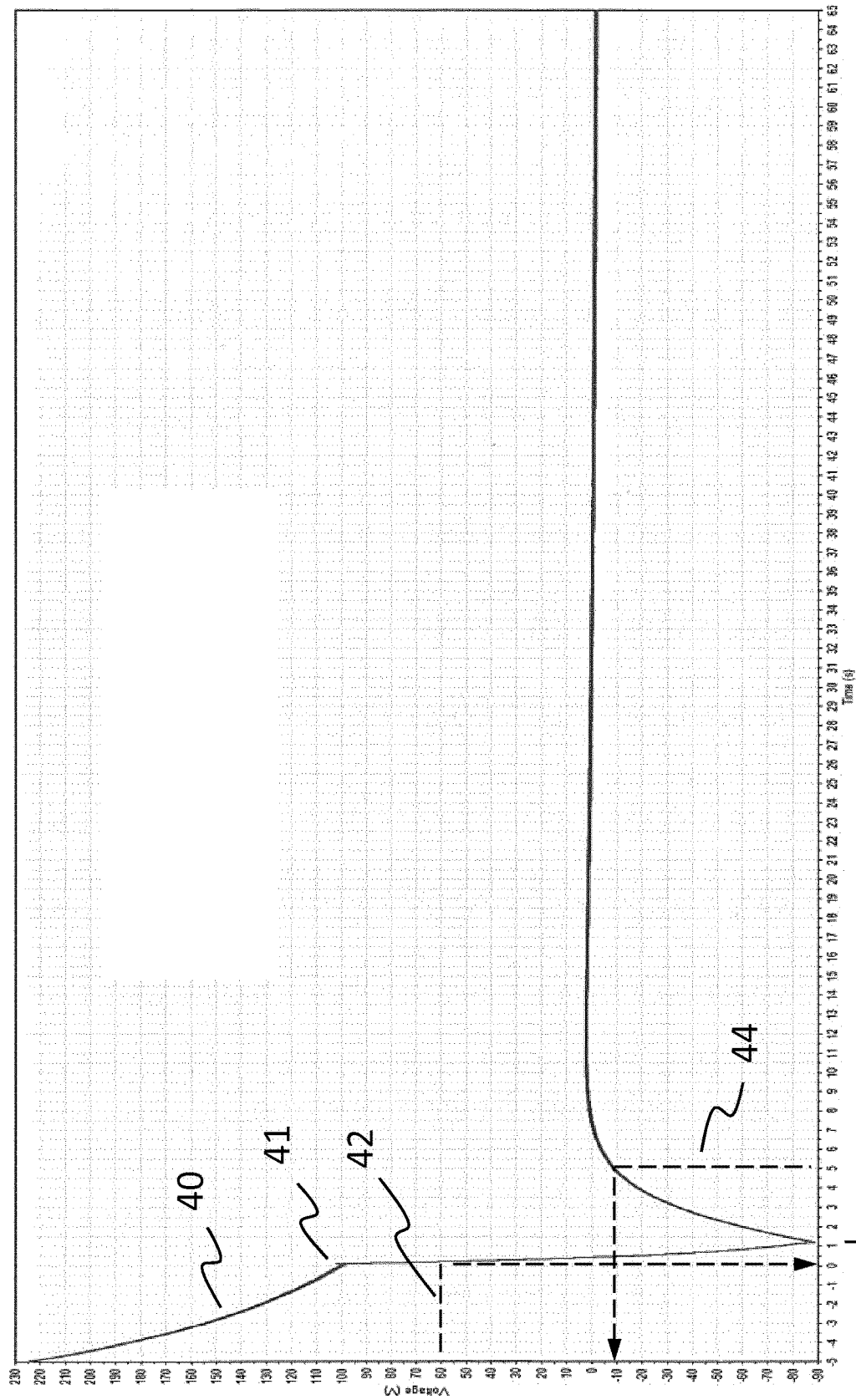
FIG. 5 is a graph showing a second read-out from the same test discharge of an electrical power bus of an HV electrical supply sub-system as that shown in FIG. 4.

FIG. 5 is a graph showing a second read-out from the same test discharge carried out on the HV electrical supply sub-system 2 shown in FIG. 2, in which the potential difference between the positive rail 14 of the electrical power bus and the chassis 18 as measured in volts on the y-axis or ordinate is again plotted against time as measured in seconds on the x-axis or abscissa. In FIG. 5, reading the graph from left to right, a first portion 40 of the graph represents the normal behaviour of the positive rail 14 before the discharge commences. As may be seen, during this time, the voltage on the positive rail 14 falls from about +230 volts to about +100 volts. At time=0 seconds, as indicated in FIG. 5 by reference numeral 41, the bus is disconnected from the battery 10, for example by opening the contactor Contactor (Bus 1), and discharge of the X capacitance between the positive and negative rails 12, 14 is initiated. This is conducted in the same manner as described above in relation to FIG. 4. The potential difference between the positive rail 14 and the chassis 18 therefore starts to drop rapidly, so that by only 0.17 seconds after commencement of the discharge, it has already reached the target value of +60 volts, as the dashed read-off line labelled 42 shows. The potential difference between the positive rail 14 and the chassis 18 continues to drop rapidly thereafter, its value becoming more negative, until the point of inflection on FIG. 5 labelled by reference numeral 43, when the positive and negative rails 12, 14 are at substantially the same voltage as each other, relative to the chassis 18. At this point, discharge of the Y capacitance between the positive rail 14 and the chassis 18 is triggered. As already stated above in relation to FIG. 4, discharge of the Y capacitance is triggered in this example when the positive and negative rails have both reached about −90 volts, relative to the chassis 18. Discharge of the Y capacitance on the positive rail 14 is initiated, for example by closing the switch $Cntrl_{iso}$ (Bus 1) connecting the positive rail 14 to the chassis 18. If the HV electrical supply sub-system comprises an auxiliary bus 16, as the HV electrical supply sub-system 2 shown in FIG. 2 does, then this can also be disconnected from the battery 10 at time =0 seconds, for example by opening the contactor Contactor (Bus n), and the switch $Cntrl_{iso}$ (Bus n) connecting the auxiliary bus 16 to the chassis 18 can be closed as well in order to discharge the Y capacitance between the auxiliary bus 16 and the chassis 18 as well.

Thereafter, the potential difference between the positive rail 14 and the chassis 18 rises so that at the predetermined time of 5 seconds after commencement of the discharge event, the potential difference between the positive rail 14 and the chassis 18 has risen to only −8.97 volts, as the dashed read-off line labelled 44 shows. This is also well below the predetermined level. As may be seen, the potential difference continues to rise asymptotically thereafter towards zero. Following the discharge, the closed switches through which the sub-system 2 has been discharged are opened once again to re-isolate the positive and negative rails 12, 14, 16 of the sub-system 2 from each other and from the chassis 18.

Figure 6:
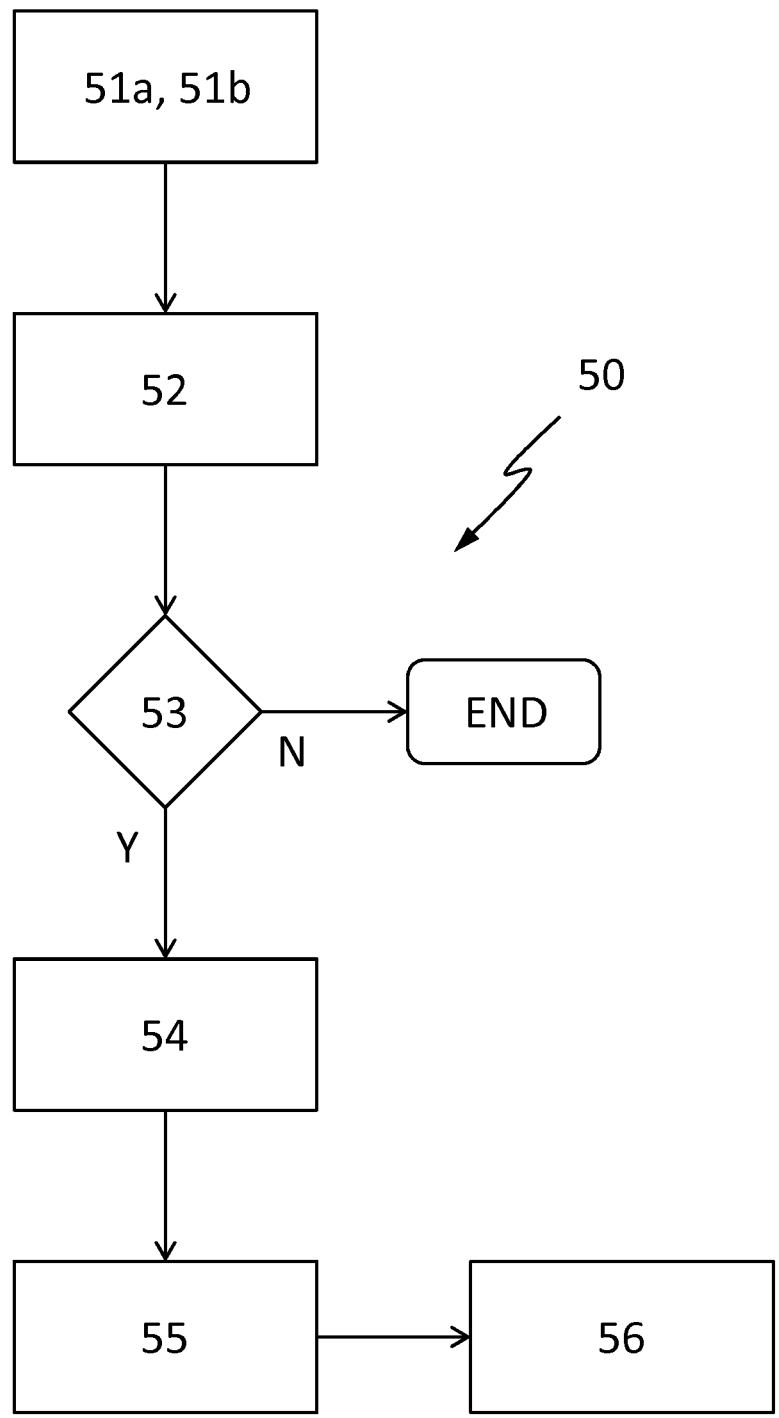
FIG. 6 is a schematic flow diagram of an embodiment of a method of reducing a potential difference between a chassis of a vehicle and an electrical power bus of an HV electrical supply sub-system such as that shown in FIG. 2.

FIG. 6 schematically shows an embodiment of a method 50 of reducing a potential difference between a chassis of a vehicle and an electrical power bus of an HV electrical supply sub-system of the vehicle, such as the HV electrical supply sub-system 2 shown in FIG. 2. Firstly, a collision of the vehicle is detected 51a or a power-down operation of the HV electrical supply sub-system 2 is initiated 51b. The electrical energy storage means 10 is then disconnected 52 from the bus 12, 14, 16. If a collision of the vehicle has been detected 51a, the electrical energy storage means 10 is disconnected 52 from the bus 12, 14, 16 immediately. If, on the other hand, a power-down operation of the HV electrical supply sub-system 2 has been initiated 51b, electrical currents on the bus are firstly reduced to substantially zero before the electrical energy storage means 10 is disconnected 52 from the bus 12, 14, 16. In either case, however, the potential difference between a rail of the bus and the chassis 18 is then measured 53 to determine if it is greater than a predetermined level. If not, the method 50 ends. If so, however, the rail of the bus is connected 54 to the chassis 18 until the potential difference between the rail and the chassis is less than the predetermined level, whereupon the rail of the bus is disconnected 55 from the chassis. This process 52, 53, 54, 55 is carried out for all of the rails of the bus to ensure complete discharge of the Y capacitance on the electrical power bus 12, 14, 16. In this embodiment, a rail of the bus of a first polarity (for example, a positive rail, such as Bus 1 or Bus n) is then also connected 56 to a rail of the bus of the opposite polarity (for example, the negative rail 12) thereafter, to ensure discharge of the X capacitance on the electrical power bus 12, 14, 16 as well.

Put another way, the potential difference between a rail of the bus having a first polarity (for example, a positive rail, such as Bus 1 or Bus n) and the chassis 18 is then measured 53 to determine if it is greater than a predetermined level. If not, the method 50 ends. If so, however, the rail of the bus of the first polarity is connected 54 to a terminal of the electrical energy storage means 10 of the opposite polarity (for example, a negative terminal) until the potential difference between the rail of the first polarity and the chassis is less than the predetermined level, whereupon the rail of the bus of the first polarity is disconnected 55 from the terminal of the electrical energy storage means 10 of the opposite polarity. This process 52, 53, 54, 55 is carried out for all of the rails of the bus to ensure complete discharge of the Y capacitance on the electrical power bus 12, 14, 16. In this embodiment, the rail of the bus of the first polarity is then also connected 56 to a rail of the bus of the opposite polarity (for example, the negative rail 12) thereafter, to ensure discharge of the X capacitance on the electrical power bus 12, 14, 16 as well.

In different possible embodiments, the electrical energy storage means 10 is disconnected 52 from the bus 12, 14, 16, the potential difference between a rail of the bus and the chassis 18 is measured 53 to determine if it is greater than the predetermined level, and the rail of the bus is connected 54 to the chassis 18, all within 1 second, preferably within 500 milliseconds, more preferably within 200 milliseconds, and most preferably within 100 milliseconds after a collision of the vehicle is detected 51a and/or a power-down operation of the HV electrical supply sub-system 2 is initiated 51b.

Put another way, in different possible embodiments, the electrical energy storage means 10 is disconnected 52 from the bus 12, 14, 16, the potential difference between the rail of the bus of the first polarity and the chassis 18 is measured 53 to determine if it is greater than the predetermined level, and the rail of the bus of the first polarity is connected 54 to the terminal of the electrical energy storage means 10 of the opposite polarity, all within 1 second, preferably within 500 milliseconds, more preferably within 200 milliseconds, and most preferably within 100 milliseconds after a collision of the vehicle is detected 51a and/or a power-down operation of the HV electrical supply sub-system 2 is initiated 51b.

In different possible embodiments, the electrical energy storage means 10 is disconnected 52 from the bus 12, 14, 16, the potential difference between a rail of the bus and the chassis 18 is measured 53 to determine if it is greater than the predetermined level, the rail of the bus is connected 54 to the chassis 18, and the rail of the bus is disconnected 55 from the chassis 18, all within 5 seconds, preferably within 3 seconds, more preferably within 2 seconds, and most preferably within 1 second after a collision of the vehicle is detected 51a and/or a power-down operation of the HV electrical supply sub-system 2 is initiated 51b.

Put another way, in different possible embodiments, the electrical energy storage means 10 is disconnected 52 from the bus 12, 14, 16, the potential difference between the rail of the bus of the first polarity and the chassis 18 is measured 53 to determine if it is greater than the predetermined level, the rail of the bus of the first polarity is connected 54 to the terminal of the electrical energy storage means 10 of the opposite polarity, and the rail of the bus of the first polarity is disconnected 55 from the terminal of the electrical energy storage means 10 of the opposite polarity, all within 5 seconds, preferably within 3 seconds, more preferably within 2 seconds, and most preferably within 1 second after a collision of the vehicle is detected 51a and/or a power-down operation of the HV electrical supply sub-system 2 is initiated 51b.

For the purposes of this disclosure, it is to be understood that the control systems described herein can each comprise a control unit or computational device having one or more electronic processors. A vehicle and/or a system thereof may comprise a single control unit or electronic controller or alternatively different functions of the controllers may be embodied in, or hosted in, different control units or controllers. A set of instructions could be provided which, when executed, cause said controllers or control units to implement the control techniques described herein, including the described methods. The set of instructions may be embedded in one or more electronic processors, or alternatively, the set of instructions could be provided as software to be executed by one or more electronic processors. For example, a first controller may be implemented in software run on one or more electronic processors, and one or more other controllers may also be implemented in software run on or more electronic processors, optionally the same one or more processors as the first controller. It will be appreciated, however, that other arrangements are also useful, and therefore, the present disclosure is not intended to be limited to any particular arrangement. In any event, the set of instructions described above may be embedded in a computer-readable storage medium (e.g., a non-transitory storage medium) that may comprise any mechanism for storing information in a form readable by a machine or electronic processors/computational device, including, without limitation: a magnetic storage medium (e.g., floppy diskette); optical storage medium (e.g., CD-ROM); magneto optical storage medium; read only memory (ROM); random access memory (RAM); erasable programmable memory (e.g., EPROM and EEPROM); flash memory; or electrical or other types of medium for storing such information/instructions.

The blocks illustrated in FIG. 6 may represent steps in a method and/or sections of code in a computer program. The illustration of a particular order to the blocks does not necessarily imply that there is a required or preferred order for the blocks and the order and arrangement of the block may be varied. Furthermore, it may be possible for some steps to be omitted.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features, whether described or not.

Although features have been described with reference to certain embodiments, those features may also be present in other embodiments whether described or not.

Whilst endeavouring in the foregoing specification to draw attention to those features of the invention believed to be of particular importance, it should be understood that the Applicant claims protection in respect of any patentable feature or combination of features hereinbefore referred to and/or shown in the drawings, whether or not particular emphasis has been placed thereon.

Further aspects of the invention are defined in the following numbered clauses:

1. A sub-system for a vehicle, wherein the sub-system comprises:
    an electrical power bus for distributing electrical power from an electrical energy storage means;
    means for disconnecting the electrical energy storage means from the bus;
    means for measuring the potential difference between a rail of the bus of a first polarity and a chassis of the vehicle; and
    means for connecting the rail of the bus of the first polarity to a terminal of the electrical energy storage means of opposite polarity if the potential difference between the rail of the bus of the first polarity and the chassis is measured to be greater than a predetermined level, until the potential difference between the rail of the first polarity and the chassis is less than the predetermined level, then disconnecting the rail of the first polarity from the terminal of the electrical energy storage means of the opposite polarity.

2. A sub-system for a vehicle according to clause 1, wherein the means for connecting the rail of the bus of the first polarity to and disconnecting the rail of the bus of the first polarity from the terminal of the electrical energy storage means of the opposite polarity comprises:
    a first resistance; and
    a first switch;
    wherein the first resistance is connectable between the rail of the bus of the first polarity and the terminal of the electrical energy storage means of the opposite polarity by closing the first switch, and wherein the first resistance and the first switch are part of a high-voltage (HV) monitoring system for measuring the potential difference between the rail of the bus of the first polarity and the terminal of the electrical energy storage means of the opposite polarity.

3. A sub-system for a vehicle according to clause 1 or clause 2, wherein the means for measuring the potential difference between the rail of the bus of the first polarity and the chassis comprises:
    a second resistance; and
    a second switch;
    wherein the second resistance is connectable between the rail of the bus of the first polarity and the chassis by closing the second switch, and wherein the second resistance and the second switch are part of an isolation monitoring system (IMS) for confirming electrical isolation of the bus from the chassis.

4. A sub-system for a vehicle according to any one of the preceding claims, comprising means for detecting a collision of the vehicle, and wherein:
    the means for disconnecting the electrical energy storage means from the bus;
    the means for measuring the potential difference between the rail of the bus of the first polarity and the chassis of the vehicle; and
    the means for connecting the rail of the bus of the first polarity to and disconnecting the rail of the bus of the first polarity from the terminal of the electrical energy storage means of the opposite polarity;
    are all controllable by the means for detecting a collision of the vehicle after the means for detecting a collision of the vehicle detects a collision of the vehicle.

5. A sub-system for a vehicle according to clause 4, wherein the means for detecting a collision of the vehicle comprises one or more of an impact sensor, a pressure sensor, a yaw-rate sensor and/or an acceleration sensor, and a restraints control module responsive to an output of the one or more sensors to control operation of:
    the means for disconnecting the electrical energy storage means from the bus;
    the means for measuring the potential difference between the rail of the bus of the first polarity and the chassis of the vehicle; and
    the means for connecting the rail of the bus of the first polarity to and disconnecting the rail of the bus of the first polarity from the terminal of the electrical energy storage means of the opposite polarity.

6. A sub-system for a vehicle according to any one of the preceding clauses, wherein:
    the means for disconnecting the electrical energy storage means from the bus;
    the means for measuring the potential difference between the rail of the bus of the first polarity and the chassis of the vehicle; and the means for connecting the rail of the bus of the first polarity to and disconnecting the rail of the bus of the first polarity from the terminal of the electrical energy storage means of the opposite polarity;

are all operable after receiving an electrical signal requesting electrical power-down of the vehicle.

7. A sub-system for a vehicle according to any one of clauses 2 to 6, wherein the first resistance has a resistance of at least 1 mega-ohm, which is substantially greater than a passive discharge resistance of a load connected to the bus.

8. A sub-system for a vehicle according to any one of the preceding clauses, comprising means for connecting the rail of the bus of the first polarity to a rail of the bus of the opposite polarity until the potential difference between the rail of the bus of the first polarity and the rail of the bus of the opposite polarity is substantially equal to zero, and then disconnecting the rail of the bus of the first polarity from the rail of the bus of the opposite polarity.

9. A sub-system for a vehicle according to clause 8, wherein the means for connecting the rail of the bus of the first polarity to and disconnecting the rail of the bus of the first polarity from the rail of the bus of the opposite polarity comprises:

a third resistance; and a third switch;

wherein the third resistance is connectable between the rail of the bus of the first polarity and the rail of the bus of the opposite polarity by closing the third switch, and wherein the third resistance and the third switch are part of the high voltage (HV) monitoring system for measuring the potential difference between the rail of the bus of the first polarity and the rail of the bus of the opposite polarity.

10. A vehicle comprising a sub-system for a vehicle according to any one of clauses 1 to 9.

11. A vehicle according to clause 10, wherein the vehicle is an electrically powered or hybrid vehicle, comprising:

an electrical energy storage means; and a combined electric traction motor/generator connectable to the electrical power bus to be supplied with electrical power from the electrical energy storage means.

12. A method of reducing a potential difference between a chassis of a vehicle and an electrical power bus for distributing electrical power from an electrical energy storage means of the vehicle to below a predetermined level, the method comprising:

disconnecting the electrical energy storage means from the bus;

measuring the potential difference between a rail of the bus of a first polarity and the chassis to determine if it is greater than the predetermined level, and if so:

connecting the rail of the bus of the first polarity to a terminal of the electrical energy storage means of the opposite polarity until the potential difference between the rail of the first polarity and the chassis is less than the predetermined level, then disconnecting the rail of the bus of the first polarity from the terminal of the electrical energy storage means of the opposite polarity.

13. A method according to clause 12, wherein:

connecting the rail of the bus of the first polarity to the terminal of the electrical energy storage means of the opposite polarity comprises switching a first resistance connectable between the rail of the bus of the first polarity and the terminal of the electrical energy storage means of the opposite polarity into connection between the rail of the first polarity and the terminal of the opposite polarity;

disconnecting the rail of the bus of the first polarity from the terminal of the electrical energy storage means of the opposite polarity comprises switching the first resistance out of connection between the rail of the first polarity and the terminal of the opposite polarity; and the first resistance is part of a high voltage (HV) monitoring system for measuring the potential difference between the rail of the bus of the first polarity and the terminal of the electrical energy storage means of the opposite polarity.

14. A method according to clause 12 or clause 13, wherein measuring the potential difference between the rail of the bus of the first polarity and the chassis comprises:

switching a second resistance connectable between the rail of the bus of the first polarity and the chassis into connection between the rail of the bus of the first polarity and the chassis; and measuring the potential difference across the second resistance when connected between the rail of the bus of the first polarity and the chassis.

15. A method according to any one of clauses 12 to 14, comprising disconnecting the electrical energy storage means from the bus, measuring the potential difference between the rail of the bus of the first polarity and the chassis, connecting the rail of the bus of the first polarity to the terminal of the electrical energy storage means of the opposite polarity, and disconnecting the rail of the bus of the first polarity from the terminal of the electrical energy storage means of the opposite polarity after detecting a collision of the vehicle.

16. A method according to clause 15, wherein disconnecting the electrical energy storage means from the bus, measuring the potential difference between the rail of the bus of the first polarity and the chassis, and connecting the rail of the bus of the first polarity to the terminal of the electrical energy storage means of the opposite polarity are all carried out within 200 milliseconds from detecting the collision of the vehicle.

17. A method according to any one of clauses 12 to 15, comprising disconnecting the electrical energy storage means from the bus, measuring the potential difference between the rail of the bus of the first polarity and the chassis, connecting the rail of the bus of the first polarity to the terminal of the electrical energy storage means of the opposite polarity, and disconnecting the rail of the bus of the first polarity from the terminal of the electrical energy storage means of the opposite polarity after receiving an electrical signal requesting electrical power-down of the vehicle.

18. A method according to clause 17, wherein disconnecting the electrical energy storage means from the bus, measuring the potential difference between the rail of the bus of the first polarity and the chassis, and connecting the rail of the bus of the first polarity to the terminal of the electrical energy storage means of the opposite polarity are all carried out within 1 second from receiving the electrical signal requesting electrical power-down of the vehicle.

19. A method according to any one of clauses 12 to 18, wherein disconnecting the electrical energy storage means from the bus, measuring the potential difference between the rail of the bus of the first polarity and the chassis, connecting the rail of the bus of the first polarity to the terminal of the electrical energy storage means of the opposite polarity, and disconnecting the rail of the bus of the first polarity from the terminal of the electrical energy storage means of the opposite polarity are all carried out within 5 seconds.

20. A method according to any one of claims 12 to 19, comprising connecting the rail of the bus of the first polarity to a rail of the bus of the opposite polarity via a third resistance after disconnecting the rail of the bus of the first polarity from the terminal of the electrical energy storage means of the opposite polarity.

21. A method according to clause 20, wherein disconnecting the electrical energy storage means from the bus, measuring the potential difference between the rail of the bus of the first polarity and the chassis, connecting the rail of the bus of the first polarity to the terminal of the electrical energy storage means of the opposite polarity, disconnecting the rail of the bus of the first polarity from the terminal of the electrical energy storage means of the opposite polarity, and connecting the rail of the bus of the first polarity to the rail of the bus of the opposite polarity are all carried out within 5 seconds.

22. A method according to any one of clauses 12 to 21, wherein the predetermined level is substantially equal to 60 volts.

23. A non-transitory computer readable medium bearing a computer program product or program code for executing a method according to any one of clauses 12 to 22.

The invention claimed is:

1. A sub-system for an electrically powered or hybrid vehicle, wherein the sub-system comprises:
   an electrical power bus for distributing electrical power from at least one high voltage electrical energy storage device;
   one or more components controllable to disconnect the at least one electrical energy storage device from the bus;
   one or more components arranged to measure the potential difference between a rail of the bus and a chassis of the vehicle; and
   one or more components controllable to connect the rail of the bus to the chassis if the potential difference between the rail of the bus and the chassis is measured to be greater than a predetermined level, until the potential difference between the rail and the chassis is less than the predetermined level, then disconnect the rail from the chassis, the one or more components controllable to connect the rail of the bus to the chassis comprising a first resistance and a first switch, the first resistance being connectable between the rail of the bus and the chassis by closing the first switch;
   wherein the first resistance and the first switch are part of an isolation monitoring system (IMS) for confirming electrical isolation of the bus from the chassis.

2. The sub-system for a vehicle according to claim 1, further comprising one or more components arranged to detect a collision of the vehicle, and wherein:
   the one or more components controllable to disconnect the at least one electrical energy storage device from the bus;
   the one or more components arranged to measure the potential difference between the rail of the bus and the chassis of the vehicle; and
   the one or more components controllable to connect the rail of the bus to the chassis until the potential difference between the rail and the chassis is less than the predetermined level and then disconnecting the rail of the bus from the chassis;
   are all controllable by the one or more components arranged to detect a collision of the vehicle after the one or more components arranged to detect a collision of the vehicle detects a collision of the vehicle.

3. The sub-system for a vehicle according to claim 2, wherein the one or more components arranged to detect a collision of the vehicle comprises one or more of the group consisting of: an impact sensor, a pressure sensor, a yaw-rate sensor and an acceleration sensor, and a restraints control module responsive to an output of the one or more sensors to control operation of:
   the one or more components controllable to disconnect the at least one electrical energy storage device from the bus;
   the one or more components arranged to measure the potential difference between the rail of the bus and the chassis of the vehicle; and
   the one or more components controllable to connect the rail of the bus to the chassis until the potential difference between the rail and the chassis is less than the predetermined level and then disconnecting the rail of the bus from the chassis.

4. The sub-system for a vehicle according to claim 1, wherein:
   the one or more components controllable to disconnect the at least one electrical energy storage device from the bus;
   the one or more components arranged to measure the potential difference between the rail of the bus and the chassis of the vehicle; and
   the one or more components controllable to connect the rail of the bus to the chassis until the potential difference between the rail and the chassis is less than the predetermined level and then disconnecting the rail of the bus from the chassis;
   are all operable after receiving an electrical signal requesting electrical power-down of the vehicle.

5. The sub-system for a vehicle according to claim 1, further comprising one or more components controllable to connect a rail of the bus of the first polarity to a rail of the bus of the opposite polarity until the potential difference between the rail of the bus of the first polarity and the rail of the bus of the opposite polarity is substantially equal to zero, and then disconnecting the rail of the bus of the first polarity from the rail of the bus of the opposite polarity.

6. The sub-system for a vehicle according to claim 5, wherein the one or more components controllable to connect the rail of the bus of the first polarity to and disconnecting the rail of the bus of the first polarity from the rail of the bus of the opposite polarity comprises:
   a second resistance; and
   a second switch;
   wherein the second resistance is connectable between the rail of the bus of the first polarity and the rail of the bus of the opposite polarity by closing the second switch, and wherein the second resistance and the second switch are part of a high voltage (HV) monitoring system for measuring the potential difference between the rail of the bus of the first polarity and the rail of the bus of the opposite polarity.

7. A vehicle comprising the sub-system for a vehicle according to claim 1.

8. A sub-system for an electrically powered or hybrid vehicle, wherein the sub-system comprises:
   an electrical power bus for distributing electrical power from an at least one electrical energy storage device;
   one or more components controllable to disconnect the at least one electrical energy storage device from the bus;
   one or more components arranged to measure the potential difference between a rail of the bus of a first polarity and a chassis of the vehicle; and one or more components controllable to connect the rail of the bus of the first polarity to a terminal of the at least one electrical energy storage device of opposite polarity if the potential difference between the rail of the bus of the first polarity and the chassis is measured to be greater than a predetermined level, until the potential difference between the rail of the first polarity and the chassis is less than the predetermined level, then disconnect the rail of the first polarity from the terminal of the at least one electrical energy storage device of the opposite polarity, the one or more components controllable to connect the rail of the bus of the first polarity to a terminal of the at least one electrical energy storage device of opposite polarity comprising a resistance and a switch, the resistance being connectable between the rail of the bus and the chassis by closing the switch;

wherein the resistance and the switch are part of a high-voltage (HV) monitoring system for measuring the potential difference between the rail of the bus of the first polarity and the terminal of the at least one electrical energy storage device of the opposite polarity.

9. A vehicle comprising the sub-system for a vehicle according to claim 8.

10. A method of reducing a potential difference between a chassis of an electrically powered or hybrid vehicle and an electrical power bus for distributing electrical power from an at least one electrical energy storage device of the vehicle to below a predetermined level, the method comprising:

disconnecting the at least one electrical energy storage device from the bus;

measuring the potential difference between a rail of the bus of a first polarity and the chassis to determine if it is greater than the predetermined level, and responsive to the potential difference being greater than the predetermined level:

connecting the rail of the bus of the first polarity to the chassis until the potential difference between the rail and the chassis is less than the predetermined level, then disconnecting the rail of the bus of the first polarity from the chassis;

wherein connecting the rail of the bus to, then disconnecting the rail of the bus from, the chassis comprises respectively closing and opening a first switch to control current through a first resistance, wherein the first switch and the first resistance are part of an isolation monitoring system (IMS) for confirming electrical isolation of the bus from the chassis.

11. The method according to claim 10, further comprising connecting a rail of the bus of a first polarity to a rail of the bus of the opposite polarity via a second resistance after disconnecting the rail of the bus of the first polarity from the chassis.

12. A tangible, non-transitory computer readable medium storing instructions that, when executed by at least one processor, cause the at least one processor to execute the method according to claim 10.

13. The method according to claim 10, wherein responsive to the potential difference between the rail of the bus of the first polarity and the chassis being greater than the predetermined level, the method further comprises connecting the rail of the bus of the first polarity to the chassis until the potential difference between the rail and the chassis is less than the predetermined level, then disconnecting the rail of the bus of the first polarity from the chassis.

14. The method according to claim 13, wherein connecting the rail of the bus of the first polarity to, then disconnecting the rail of the bus of the first polarity from, the chassis comprises using the same means as for measuring the potential difference between the rail of the bus and the chassis.

15. A method of reducing a potential difference between a chassis of an electrically powered or hybrid vehicle and an electrical power bus for distributing electrical power from an at least one electrical energy storage device of the vehicle to below a predetermined level, the method comprising:

disconnecting the at least one electrical energy storage device from the bus;

measuring the potential difference between a rail of the bus of a first polarity and the chassis to determine if it is greater than the predetermined level, and responsive to the potential difference being greater than the predetermined level:

connecting the rail of the bus of the first polarity to a terminal of the at least one electrical energy storage device of the opposite polarity until the potential difference between the rail and the chassis is less than the predetermined level, then disconnecting the rail of the bus of the first polarity from the terminal of the at least one electrical energy storage device of the opposite polarity;

wherein connecting the rail of the bus to, then disconnecting the rail of the bus from, the terminal of the at least one electrical storage device comprises respectively closing and opening a switch to control current through a resistance;

wherein the resistance and the switch are part of a high-voltage (HV) monitoring system for measuring the potential difference between the rail of the bus of the first polarity and the terminal of the at least one electrical energy storage device of the opposite polarity.

* * * * *